United States Patent
Yamade

[11] Patent Number: 5,663,770
[45] Date of Patent: Sep. 2, 1997

[54] WHITE BALANCE CIRCUIT IN WHICH LOW LIGHT ADJUSTMENT IS NOT INFLUENCED BY HIGH LIGHT ADJUSTMENT

[75] Inventor: Shigemitsu Yamade, Hachiman, Japan

[73] Assignee: Matsushita Electric Industrial Co., Ltd., Osaka, Japan

[21] Appl. No.: 396,270

[22] Filed: Feb. 28, 1995

Related U.S. Application Data

[63] Continuation of Ser. No. 81,601, Jun. 23, 1993, abandoned.

[30] Foreign Application Priority Data

Jul. 6, 1992 [JP] Japan ................. 4-178028

[51] Int. Cl.$^6$ ................. H04N 9/72; H04N 9/73
[52] U.S. Cl. ................. 348/656; 348/655; 348/692
[58] Field of Search ................. 348/223, 655, 348/656, 691, 692; H04N 9/72, 9/73, 9/64

[56] References Cited

U.S. PATENT DOCUMENTS 4,178,558  12/1979  Nagashima et al. ............ 358/34
5,107,189   4/1992  Page ............................... 358/34

*Primary Examiner*—James J. Groody
*Assistant Examiner*—Cheryl Cohen
*Attorney, Agent, or Firm*—Ratner & Prestia

[57] ABSTRACT

A color picture display apparatus is provided having a driving circuit for a display device so that a low light adjustment is not influenced by a high light adjustment during white balance adjustment. Horizontal blanking period is blanked by a transistor and a clamping potential of a low light level for white balance adjustment is added to the above blanked signal. The signal, to which a clamping potential was added, is gain-adjusted and clamped by a capacitor and a transistor. Next, the clamped portion is blanked at a transistor and the blanked signal is supplied to a CRT through a driving stage. Low light adjustment is done by adjusting clamping potential with a potentiometer and high light adjustment is done by adjusting gain with another potentiometer.

8 Claims, 4 Drawing Sheets

GREEN DRIVING CIRCUIT

WHITE BALANCE CIRCUIT IN WHICH LOW LIGHT ADJUSTMENT IS NOT INFLUENCED BY HIGH LIGHT ADJUSTMENT

This application is a continuation of application Ser. No. 08/081,601 filed Jun. 23, 1993, now abandoned.

BACKGROUND OF THE INVENTION

1. Field of the Invention

This invention relates to a driving circuit for picture display devices such as Cathode Ray Tubes (CRT) in color television receivers.

2. Description of the Prior Art

In the field of television receivers, receivers have been provided with more and more functions and picture quality has been clearer and clearer. As a new display device, liquid crystal panels are gradually being adapted besides CRT's.

A driving circuit in accordance with the prior art, for use with a picture display device in color television receivers, is explained below.

FIG. 1 is a circuit diagram of a prior art exemplary CRT driving circuit. In FIG. 1, guns for red, green and blue in the CRT are driven by respective driving circuits. As circuit diagrams for the red and blue guns are the same as that for the green gun, only a circuit diagram for the green gun is shown in the drawing.

Transistors Q1 and Q2 are connected in cascade. A capacitor C1 for frequency characteristic compensation and a series connection of a resistor R1 and a potentiometer VR2 are connected between the emitter of the transistor Q1 and the ground. The emitter of the transistor Q1 is connected to the potentiometer VR1 for low light white balance adjustment via a resistor R2. A load resistor R4 is connected between the collector of the transistor Q2 and a power source BH. A video signal at the collector of the transistor Q2 is led to the CRT cathode via a resistor R5.

The action of the CRT driving circuit mentioned above and the white balance adjustment are explained in the following.

As the transistor Q1 and Q2 are connected in cascade, when the resistor R2 is large enough, the gain of the driving circuit is expressed as R4/(R1+VR2), where R4, R1 and VR2 are the resistance values of the resistors R4 and R1 and the potentiometer VR2, respectively. Therefore, the gain is adjustable by the potentiometer VR2.

This driving circuit can be regarded as a d-c amplifier and its d-c offset amount can be varied with the potentiometer VR1. White balance adjustment of this driving circuit is done so that the specified brightness ratios of red, green and blue are obtained at the two brightness levels of low light and high light.

That is, a low light reference signal (flat signal), which level is adjusted at the input of the circuit, is applied to the input of the circuit so that a specified brightness (for example, 5% of the green maximum brightness) is obtained. Then, each potentiometer VR1 for low light adjustment in the red and blue channels is adjusted so that the specified red and blue low light brightnesses are obtained, respectively.

Then, a high light reference signal (flat signal) is applied to the input of the circuit so that a specified brightness (for example, 60% of the green maximum brightness) is obtained by adjusting the potentiometer VR2 for high light adjustment. Then, each potentiometer VR2 in the red and blue circuits is adjusted so that a high light white raster is observed on the CRT screen.

Although adjustment levels for low light and high light were explained as 5% and 60% of the maximum brightness, respectively, in the above example, the adjustment levels are desirably specified so that a good tracking characteristic for white balance is obtained, considering light emitting characteristics of red, green and blue phosphors of a CRT.

However, in the above mentioned circuit, the potentiometer VR2 for high light adjustment varies not only the gain but also the d-c offset amount and the potentiometer VR1 for low light adjustment varies not only the offset amount but also the gain. As high light adjustment and low light adjustment affect each other, a correct adjustment is not obtained unless these adjustments are repeated.

SUMMARY OF THE INVENTION

The present invention relates to a driving circuit for a color picture display device which includes (1) a means to add a clamping potential which is the same level as the low light signal level for adjusting white balance during a blanking period of the video signal, (2) a means to control the gain, (3) a means to clamp at the portion where the clamping potential is added after the former two means (1) and (2), (4) a means to blank the portion where a clamping signal was added, (5) a means to adjust the clamping potential or the d-c offset amount after clamping, and (6) a means to drive a display device.

An advantage of this invention is that the low light level, which was once adjusted by adjusting the clamping voltage, namely, the d-c offset level, does not vary if the high light level is adjusted by adjusting the gain.

DETAILED DESCRIPTION OF THE INVENTION

Figure 1:
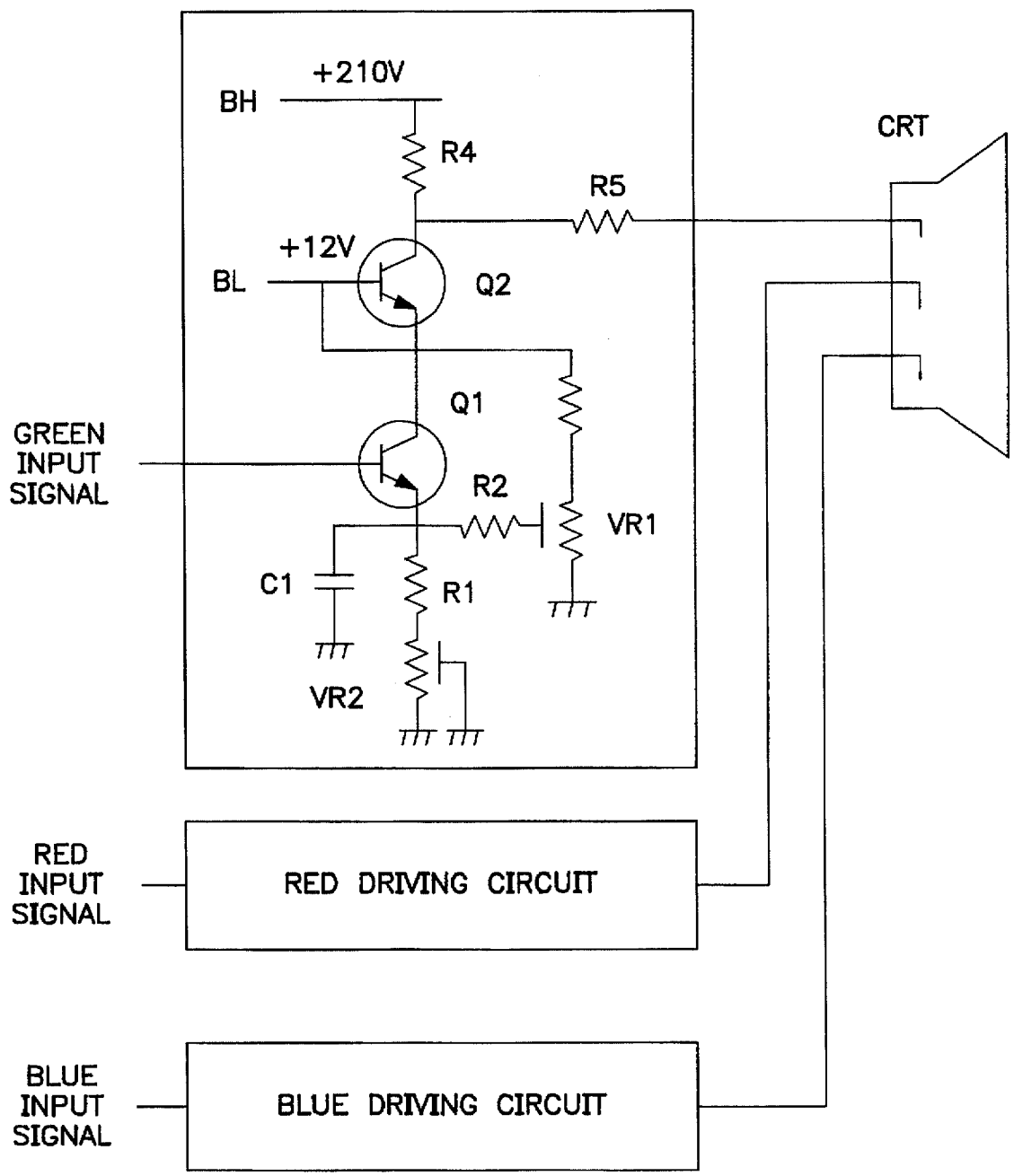
FIG. 1 is a circuit diagram of a driving circuit for a color picture display device in accordance with the prior art.

Referring now to the drawings, an exemplary embodiment of the present invention is explained in detail.

Figure 2:
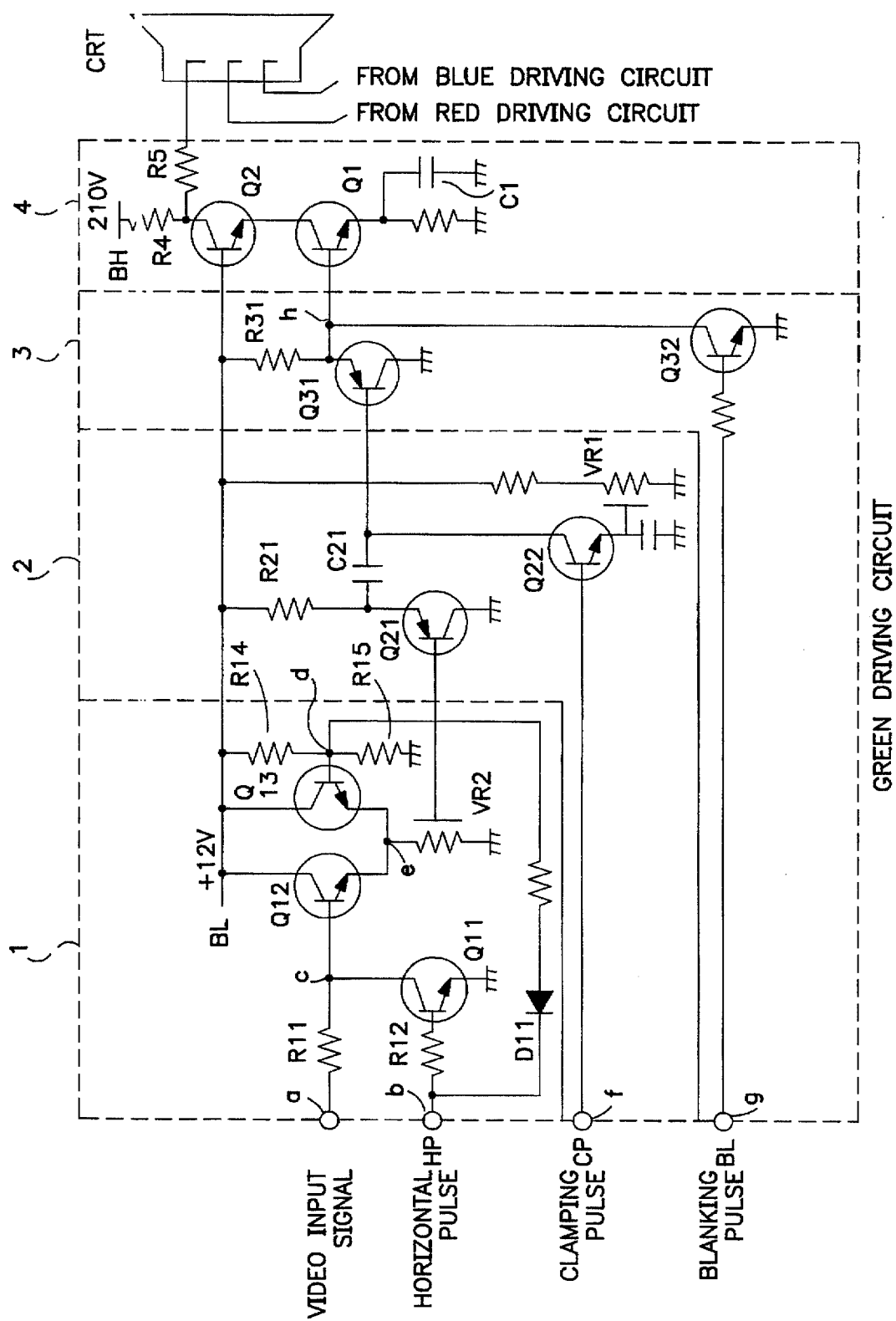
FIG. 2 is a circuit diagram of a driving circuit for a color picture display device in accordance with an exemplary embodiment of the present invention.

FIG. 2 shows an example of a driving circuit for a color picture display device (CRT). As the driving circuits for a red gun and a blue gun are the same as that for a green gun, only a circuit for the green gun is shown in the drawing.

In FIG. 2, 1 is a low light potential adding circuit, 2 is a clamping circuit, 3 is a blanking circuit, and 4 is an output circuit to drive a CRT.

The actions in each part shown in FIG. 2 are explained below, referring to FIG.3(a). When a video signal like the waveform a is applied to the video input terminal, the horizontal blanking period is blanked by the resistor R11 and the transistor Q11, in which the horizontal pulse HP (waveform b) for adding the clamping potential is applied. The signal at the base of the transistor Q12 becomes that as shown by waveform c. During the horizontal pulse, the diode D11 is off and the voltage at the base of the transistor Q13 becomes the voltage Ec defined by the resistors R14 and R15. During the period excluding the horizontal pulse (scanning period in rough expression), the diode D11 becomes conductive and the base potential of the transistor Q13 drops. Thus the waveform at the base of the transistor Q13 becomes waveform d. The potential Ec is set to the potential of the low light signal at white balance adjustment.

Figure 3:
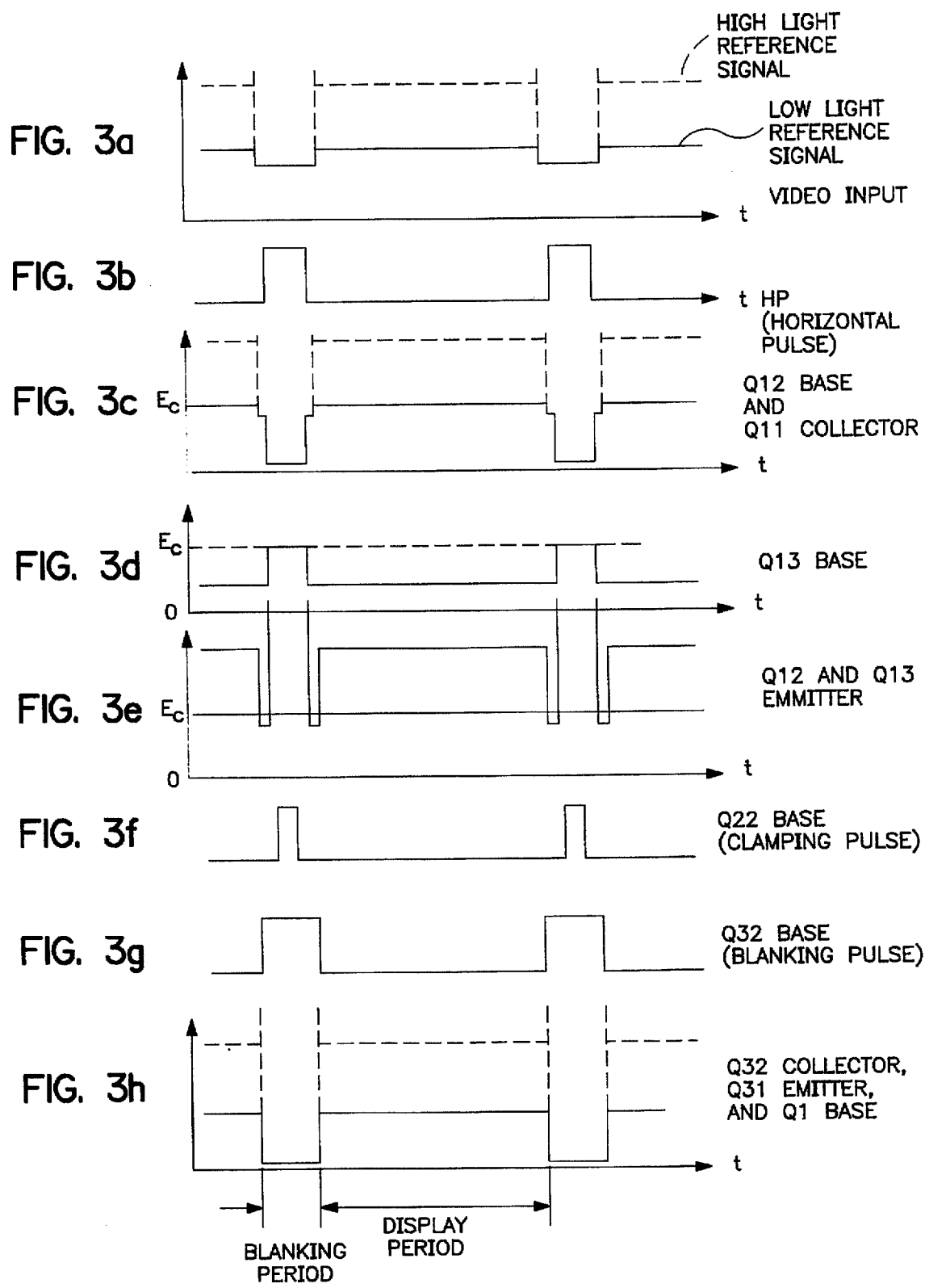
FIGS. 3(a)–(h) illustrate waveforms to explain the actions in the two examples shown in FIG. 2 and FIG. 4.

As the emitters of the transistors Q12 and Q13 are connected, the higher voltage between the waveform c and the waveform d appears at the common emitter of the transistors Q12 and Q13 and the waveform at the emitter of the transistor Q12 becomes the waveforms e in FIG. 3(e). Thus, the clamping potential for low light level adjustment was added to the blanking period of the input video signal a.

Then, the signal with the waveform e is divided by the potentiometer VR2 and is led to the collector of the transistor Q22 via the emitter follower transistor Q21 and the capacitor C21.

The transistor Q22 works as a switch by feeding a clamping pulse (waveform f) to its base, the signal at the collector of the transistor Q22, which has the same waveform as e, is clamped at the period (t1–t2) of the horizontal pulse HP. This clamped level corresponds to the low light level.

The signal is passed through the emitter follower transistor Q31 and is blanked at the transistor Q32, which base the blanking pulse (waveform g) is applied to. As a result, the signal at the collector of the transistor Q32 becomes similar to waveform h. The blanking pulse (waveform g) is added in order to prevent observing the low light signal on the CRT screen during the retrace period as result of superimposition during the trace period.

After that, the signal (shown in waveform h) is fed to the CRT via the video drive stage, which is a cascaded connection of the transistors Q2 and Q1, and is displayed on the CRT screen.

A method of white balance adjustment for a color picture display apparatus (television receivers), which employ CRT driving circuits mentioned above is explained.

First, low light adjustment is done as follows. A low light reference signal (flat signal) is applied to the television receiver. Observing a waveform at the emitter of the transistor Q12 in the green channel, the input signal level is adjusted so that the green input signal and the added low light level have the same level. The potentiometer VR1 in the green channel is adjusted so that the specified low light brightness is obtained on the CRT screen. Then, each potentiometer VR1 in the red and blue channels is adjusted so that the specified red and blue low light brightnesses are obtained, respectively. Thus, the low light adjustment is finished.

Next, the high light adjustment is done as follows. A high light reference signal (flat signal) is applied to the television receiver. The potentiometer VR2 in the green channel is adjusted so that the specified high light brightness is obtained on the CRT screen. Then each potentiometer VR2 in the red and blue channels is adjusted so that the specified red and blue high light brightnesses are obtained, respectively.

As the high light adjustment does not affect the clamping potential of the low light, the low light adjustment which was finished before does not change.

According to the present invention, because the following circuits are provided, low light adjustment is not affected by high light adjustment even if the high light adjustment is done after the low light adjustment. (1) a circuit to add the same clamping potential as the low light white balance adjustment signal during a horizontal blanking period, (2) a gain control circuit, (3) a clamping circuit, (4) a circuit to adjust the clamping level, and (5) a blanking circuit to blank the previously added clamping signal. Thus, no more repeating adjustment is needed.

Figure 4:
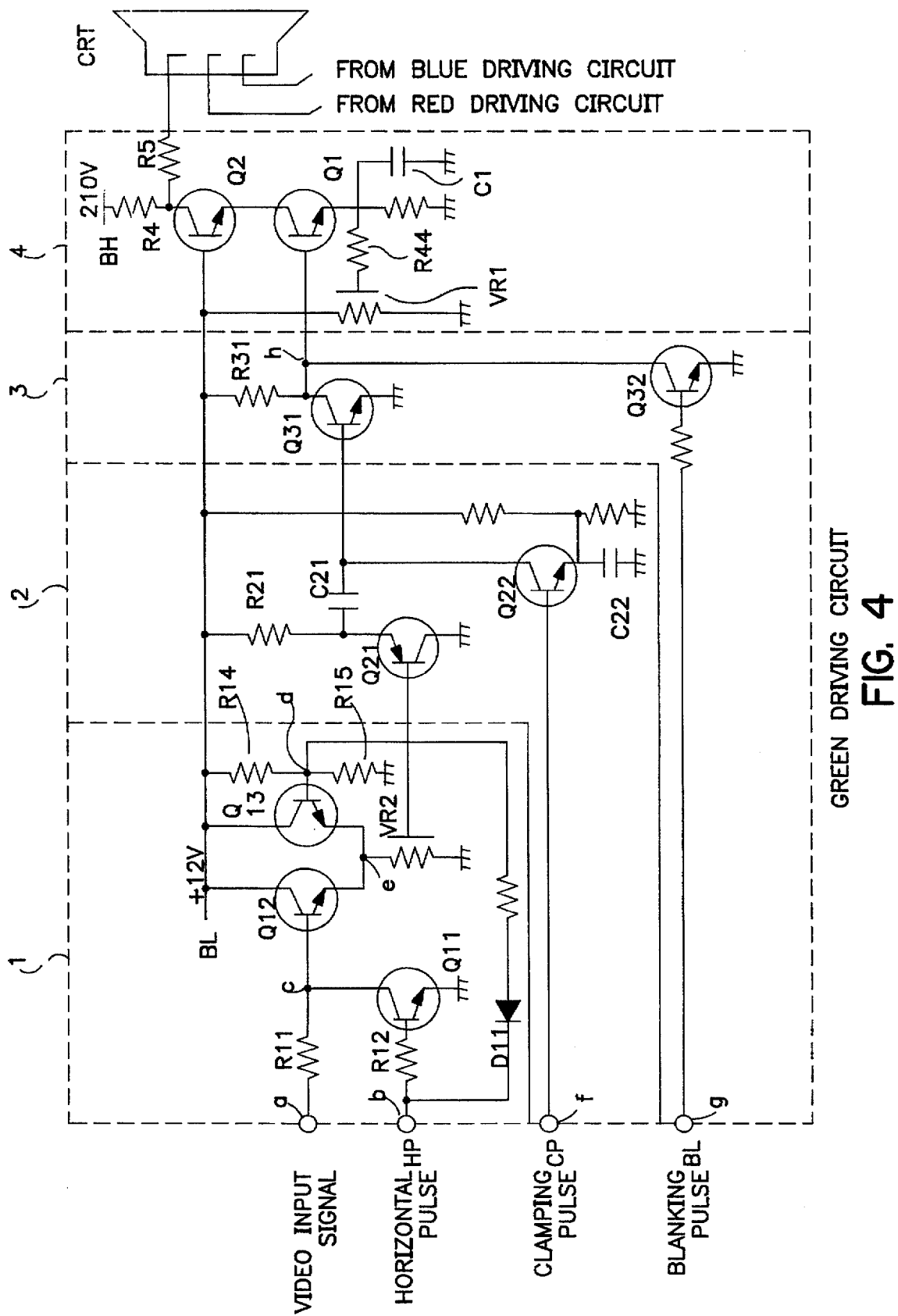
FIG. 4 is a circuit diagram of a driving circuit for a color picture display device in accordance with a further exemplary embodiment of the present invention.

Referring now to FIG. 4, another exemplary embodiment of the present invention is explained.

The same numbers as that in FIG. 2 are appointed to the components and circuit blocks which have the same function as those in FIG. 2. The differences from FIG. 2 are (1) the clamping potential of the clamping circuit 2 is fixed and (2) an offset adjusting circuit comprised of the potentiometer VR1 and R14 is added in the output circuit 2.

Other than the fact that the low light adjustment is done by adjusting the d-c offset in the output circuit instead of adjusting the clamping level in the first exemplary embodiment, the other functions are similar to the first exemplary embodiment.

By providing a means to adjust the d-c offset in the output circuit instead of a means to adjust the clamping potential in the first exemplary embodiment, an effect which is similar to that obtained by the first exemplary embodiment can be obtained.

In the first and second exemplary embodiments, at the low light white balance adjustment, if the input terminal of the horizontal pulse is fixed to the d-c potential for high light adjustment, the whole period of the video signal is blanked and on the CRT screen the clamping level itself is displayed. That is, the low light adjustment can be done with a flat video signal having a high light clamping potential which is internally generated instead of a low light reference signal which is externally applied.

Thus, a low light reference signal becomes unnecessary, an adjustment between the input signal and the clamping level becomes unnecessary and the adjustment procedure is simplified for low light white balance adjustment.

In a transparent type display devices such as a liquid crystal display panel, it may be possible that high light adjustment is done by d-c level and low light adjustment is done by gain. The same invention can be applied if the low light and the high light are interchanged.

An advantage of this invention is that repetitive adjustment of low light and high light becomes unnecessary by providing a means to add a clamping potential which is the same level as the low light signal for white balance adjustment during a blanking period, a means to adjust the gain, a means to clamp at the clamping potential adding circuit, a means to blank the added clamping pulse.

The invention my be embodied in other specific form without department from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A color picture display apparatus for providing to display means an output video signal with adjusted white balance, said color picture display apparatus comprising:

assignment means for assigning a first potential to an input video signal during a blanking period of said input signal, said first potential substantially equal to a first light level, wherein said first light level is used for adjusting said white balance and wherein said assignment means generates an assignment output signal;

gain control means for controlling the amplitude of said assignment output signal to generate a gain control output signal;

clamping means for clamping said gain control output signal at a second potential, to generate a clamping output signal;

blanking means for blanking said clamping output signal to generate said output video signal; and means for providing said output video signal to said display means.

2. A color picture display apparatus as recited in claim 1 wherein said display has a reference brightness when said input video signal has a potential equal to said first potential, wherein said reference brightness is a percentage of a maximum brightness of said input video signal.

3. A color picture display apparatus recited in claim 1 wherein said white balance of said input video signal is dependent on said first light level and a second light level, wherein said white balance is adjusted by altering said first light level set by said clamping means and said second light level set by said gain control means.

4. A color picture display apparatus recited in claim 3 comprising:

further assignment means, further gain control means, further clamping means and further blanking means for each color signal of said input video signal.

5. A color picture display apparatus recited in claim 1 further comprising:

output means for generating an offset voltage, wherein said offset voltage is applied to said output video signal; and adjustment means for adjusting the magnitude of said offset voltage.

6. A color picture display apparatus recited in claim 5 comprising:

further assignment means, further gain control means, further clamping means and further blanking means for each color signal of said input video signal.

7. A color picture display apparatus recited in claim 1 wherein:

said assignment means assigns said first potential to said input video signal during a display period, different from said blanking period, when said white balance is adjusted; and wherein an adjustment of said white balance is performed by measuring the brightness of said first potential displayed on said display.

8. A color picture display apparatus recited in claim 1 wherein said assignment means comprises:

means for applying said input video signal to a base of one transistor of two emitter coupled transistors;

means for applying said first potential to the base of the other transistor of said two emitter coupled transistors during said blanking period;

wherein the emitters of said two transistors provide an output signal assigned to said first potential during said blanking period.

* * * * *